(12) United States Patent
Wood et al.

(10) Patent No.: US 6,775,067 B2
(45) Date of Patent: Aug. 10, 2004

(54) METHOD AND APPARATUS FOR STRETCHING AN OPTICAL PULSE

(75) Inventors: James R. Wood, Grapevine, TX (US); Pradip Mitra, Grand Prairie, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 48 days.

(21) Appl. No.: 10/164,483

(22) Filed: Jun. 6, 2002

(65) Prior Publication Data

US 2003/0227686 A1 Dec. 11, 2003

(51) Int. Cl.⁷ .............................................. G02B 27/00
(52) U.S. Cl. ...................... 359/577; 359/260; 398/102; 356/519
(58) Field of Search ................................. 359/577–579, 359/260, 584; 372/700; 398/102, 103; 356/514, 519, 506

(56) References Cited

U.S. PATENT DOCUMENTS

| | | | |
|---|---|---|---|
| 3,879,109 A | * 4/1975 | Thomas ....................... 359/629 |
| 3,923,380 A | 12/1975 | Hattori et al. .......... 350/160 R |
| 4,553,816 A | 11/1985 | Durand et al. .............. 350/166 |
| 4,558,950 A | 12/1985 | Ulrich et al. ................ 356/345 |
| 4,756,606 A | 7/1988 | Jewell et al. ................ 350/354 |
| 4,990,465 A | * 2/1991 | Liau et al. ...................... 438/29 |
| 5,343,489 A | * 8/1994 | Wangler ....................... 372/93 |
| 5,452,121 A | 9/1995 | Hilgeman .................... 359/260 |
| 5,584,117 A | 12/1996 | Lee et al. ...................... 29/620 |
| 5,759,453 A | * 6/1998 | Kato .......................... 264/1.25 |
| 5,835,214 A | 11/1998 | Cabib et al. ................ 356/346 |

* cited by examiner

*Primary Examiner*—Drew A. Dunn
*Assistant Examiner*—Leo Boutsikaris
(74) *Attorney, Agent, or Firm*—Williams, Morgan & Amerson, P.C.

(57) ABSTRACT

A method and apparatus for stretching a pulse, shaping a stretched pulse, and modeling a stretched and/or shaped pulse are disclosed. An etalon has a port, a partially reflective surface, and a fully reflective surface. A base pulse is introduced into the etalon, and a plurality of portions of the base pulse propagating from the etalon are collected. The collected portions are then combined to generate a stretched pulse whose width is proportional to the width of the base pulse. This can be modeled by assigning a transmission factor value to each one of a plurality of taps and a reflection factor value to each one of the taps, excepting only one tap. A transport delay for is assigned to each tap to which a reflection factor value was assigned, wherein the transport delay is proportional to the width of a base pulse.

33 Claims, 9 Drawing Sheets

METHOD AND APPARATUS FOR STRETCHING AN OPTICAL PULSE

BACKGROUND OF THE INVENTION

1. Field of the Invention

The present invention pertains to optical pulse stretchers, and, more particularly, to an optical pulse stretcher etalon.

2. Description of the Related Art

The increasing power and speed of many types of electronic systems has focused attention on optical technologies. Optical technologies are attractive for a variety of reasons that may vary depending on the type of technology. However, desirable characteristics typically include generally faster transmission and higher bandwidth of optical signals relative to electrical signals. Information is typically conveyed in optical signals in a series of light pulses, or "optical pulse trains." Frequently, although not always, the optical pulses convey information digitally in 0's and 1's just as electrical pulses in electrical signals do.

Optical technologies are nevertheless not without their own problems. One problem arises from the fleeting nature of the light pulses. Demanding applications employ light pulses of very short duration, e.g., 1 ns or 1 ps, and future increases in capabilities are expected to push pulse widths even lower. Although the signals in optical systems are light pulses, the optical systems themselves employ optoelectronic components that are partly optical and partly electronic. Pulse widths of the magnitudes contemplated herein are difficult for the electronic side of the optoelectronic components to process in a timely fashion.

One solution to this dilemma is to "stretch" the light pulses. One common type of pulse stretcher is the "etalon." An etalon is basically a cavity bounded by two reflective surfaces. One surface is essentially completely reflective, e.g., a mirror. The other surface is partially reflective, i.e., part of the optical signal will reflect off the surface while a portion of the optical signal propagates through the surface. Thus, an optical signal is introduced into the cavity and impinges upon the partially reflective surface first. A portion of the optical signal propagates through the partially reflective surface. A portion also reflects off the partially reflective surface to the fully reflective surface, which then again reflects from the fully reflective portion. The twice reflected portion then impinges upon the partially reflective surface, whereupon the process repeats. The pulse portions propagating through the partially reflective surface are then collected and combined to create a "composite" pulse.

This "composite" pulse is "stretched," i.e., of longer duration than the "base" pulse that was originally directed into the etalon. This technique admirably produces wider, i.e., longer duration, pulses. The stretched pulses are easier for the electrical part of the opto-electronic components to handle and process. However, several drawbacks accompany these pulse stretching techniques.

One significant problem is information loss. For instance, the width of the pulse might carry certain information that can be useful. The spacing of the reflective surfaces in conventional etalons, however, is driven by considerations such as volume and size, as opposed to any characteristic of the light pulses. The characteristics of the resultant stretched pulse bear no relationship to the characteristics of the base pulse from which such information can be retrieved. Thus, meaningful information that may be conveyed by the width of the base pulse is lost.

Another significant problem impacts the detector that processes the stretched pulses. The stretched pulse typically presents abrupt changes in intensity levels, e.g. from "off" to "on," with very short transition periods. These abrupt transitions can generate a phenomenon known as "ringing" in the detector's electronics. The detector's electronics consequently must be designed to deal with this phenomenon, which complicates the electronics and can increase the space needed for the electronics within the optical system. Complexity is generally proportional to the rate of failure. In some high performance applications, space is at a premium. The need to compensate for ringing can therefore be highly undesirable in some applications.

The present invention is directed to resolving, or at least reducing, one or all of the problems mentioned above.

SUMMARY OF THE INVENTION

The invention, in its various aspect, embodiments, and implementations, is a method and apparatus for stretching a pulse, shaping a stretched pulse, and modeling a stretched and/or shaped pulse.

In a first aspect, the invention includes an etalon comprising a port, a partially reflective surface, and a fully reflective surface. A base pulse may be introduced through the port whereupon it impinges upon the partially reflective surface. The fully reflective surface is spaced apart from the partially reflective surface a distance proportional to the width of the base pulse in operative relationship to the partially reflective surface. In various embodiments, this aspect includes such an etalon employed as a pulse stretcher in an optical system.

In a second aspect, the invention includes a method for shaping an optical pulse. The method comprises introducing a base pulse into an etalon, the etalon including a fully reflective surface spaced apart from a partially reflective surface a distance proportional to the width of the base pulse; collecting a plurality of portions of the base pulse propagating from the etalon; and combining the plurality of portions to generate a stretched pulse whose width is proportional to the width of the base pulse.

In a third aspect, the invention includes a method for modeling an optical pulse stretcher. The method comprises assigning a transmission factor value to each one of a plurality of taps; assigning a reflection factor value to each one of the taps, excepting only one tap; and assigning a transport delay for each tap to which a reflection factor value was assigned, wherein the transport delay is proportional to the width of a base pulse. This third aspect also includes, in its variants, a program storage medium encoded with instructions that perform such a method when executed by a computer and a computer programmed to perform such a method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
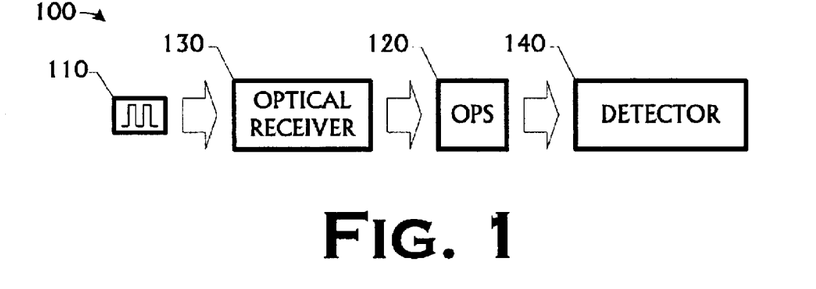
FIG. 1 illustrates an optical system receiving an optical pulse train, the optical system employing an optical pulse stretcher in accordance with the present invention.

FIG. 1 illustrates an optical system 100 receiving an optical pulse train 110, the optical system 100 employing an optical pulse stretcher ("OPS") 120 in accordance with the present invention. The optical system 100 also includes an optical receiver 130 and a detector 140. In general, the optical receiver 130 receives the optical pulse train 110 and transmits the received optical pulse train 110 to the OPS 120 in accordance with conventional practice. The OPS 120 stretches each pulse in the optical pulse train 110. The detector 140 then detects and/or processes the stretched pulses in accordance with conventional practice.

The manner in which the optical receiver 130 and the detector 140 are implemented will depend on the application of the particular embodiment. For instance, the optical system 100 may be employed, in some embodiments, in an optical computing system or, in alternative embodiments, a laser radar ("LADAR") system. The optical receiver 130 and the detector 140 will be implemented differently in these alternative embodiments because of constraints inherently arising from these diverse applications. However, these implementation specific details will be readily apparent and easily supplemented by those skilled in the art having the benefit of this disclosure.

Figure 2:
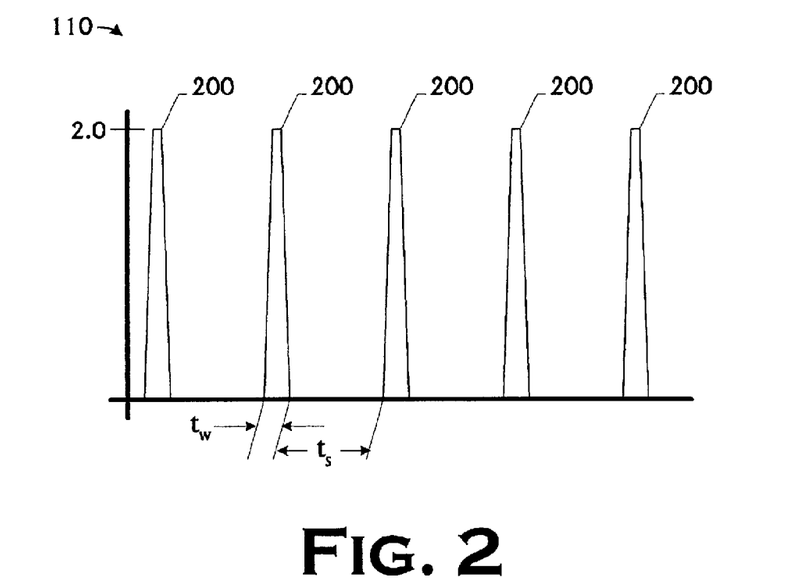
FIG. 2 depicts the optical pulse train of FIG. 1.

FIG. 2 conceptually depicts the optical pulse train 110 of FIG. 1. The optical pulse train 110 comprises a plurality of pulses 200, each having a width $t_w$, spaced apart by duration of $t_s$. The present invention employs an a priori knowledge of the pulse widths $t_w$, in the design of the OPS 120 as is discussed further below. The amplitude of the individual pulses 200 is immaterial to the practice of the invention, although it may be a design consideration in individual implementations. The manner in which the optical pulse train 110 is generated is likewise immaterial to the practice of the invention. Note that the optical pulse train 110 is periodic.

Figure 3A:
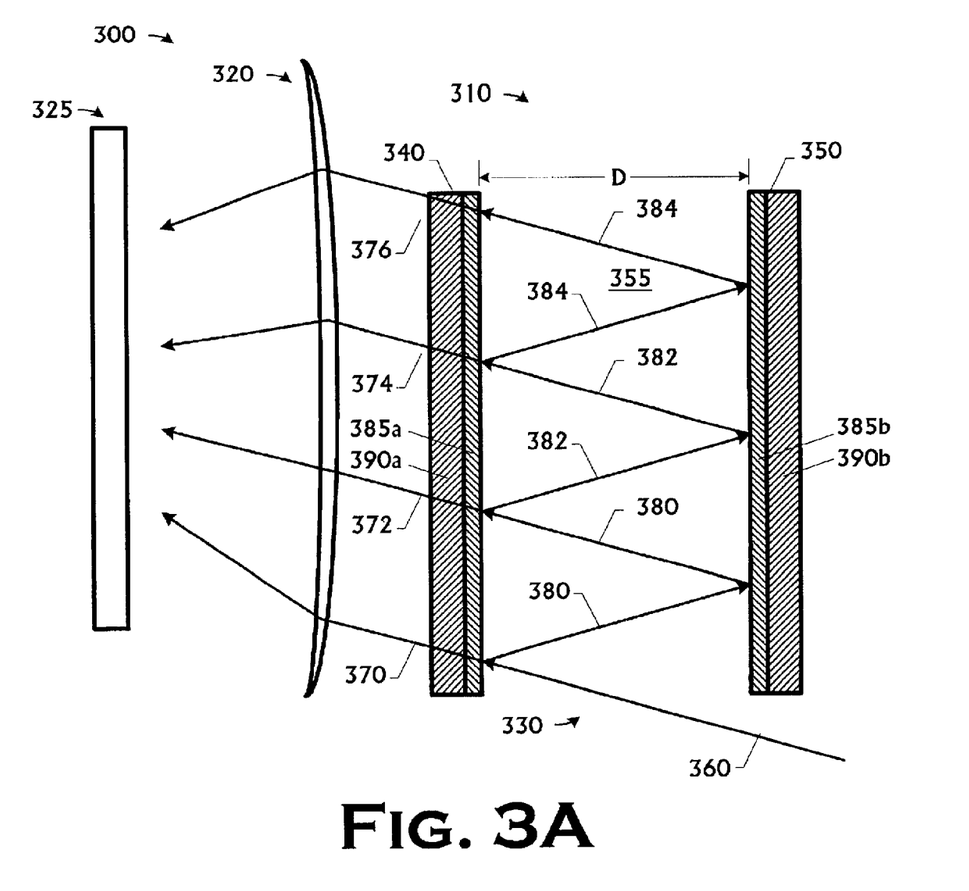
FIG. 3A conceptually illustrates a portion of one particular embodiment of the optical pulse stretcher in the optical system of FIG. 1.

FIG. 3A conceptually illustrates a portion 300 of one particular embodiment of the optical pulse stretcher 120 in the optical system 100 of FIG. 1. The portion 300 includes an etalon 310, an optical collector 320, and a combiner 325. A base pulse 360 is introduced into the etalon 310. Portions 370, 372, 374, and 376 of the base pulse 360 are collected by the optical collector 320 as they propagate from the etalon 310. The combiner 325 then combines the collected portions 370, 372, 374, and 376 to generate the stretched pulse (not shown in FIG. 3A).

More particularly, the etalon 310 includes a port 330, a partially reflective surface 340, and a fully reflective surface 350. The fully reflective surface 350 is spaced apart from the partially reflective surface 340 a distance D proportional to the width $t_w$ of the base pulse 360. The fully reflective surface 350 is also positioned in operative relationship to the partially reflective surface 340. The phrase "in operative relationship," as used herein, means that an optical signal, or any portion thereof, incident upon the fully reflective surface 350 will be reflected to the partially reflective surface 340. The partially reflective surface 340 and the fully reflective surface 350 bound a cavity 355 through which optical signals and portions thereof propagate as is described further below.

A base pulse 360, which may be any pulse 200 (shown in FIG. 2) of the optical pulse train 110 (first shown in FIG. 1), may be introduced through the port 330. The base pulse 360 impinges upon the partially reflective surface 340, whereupon a portion 370 propagates through the partially reflective surface 340 and a portion 380 is reflected to the fully reflective surface 350. The portion 380 impinges upon the fully reflective surface 350, and is fully reflected back to the partially reflective surface 340.

This process repeats until the energy of the base pulse 360 is dissipated. In the illustrated embodiment of FIG. 3A, this process occurs four times. Portions 372, 374, 376 of the portions 380, 382, 384, respectively, propagate through the partially reflective surface 340 while portions 382, 384 of the portions 380, 382, respectively, are reflected back to the fully reflective surface 350. Note that no portion of the portion 384 impinging upon the partially reflective surface 340 is reflected back since the energy of the base pulse 360 has been dissipated. Note that the number of times portions of the base pulse 360 are reflected back and forth through the cavity 355 will be implementation specific, depending upon the amount of each reflection from the partially reflective surface 340. Thus, although four such reflections are shown, there may be any number.

The partially reflective surface 340 may, in some embodiments, be fabricated in accordance with conventional practice. The partially reflective surface 340 comprises a coating 385a on a substrate 390a. The coating 385a may be, for example, a Titanium/Gold (Ti/Au) coating, where the Ti is 15–50 Å thick and the Au is 100–2000 Å thick. The substrate 390a may be, for example, a glass or sapphire substrate.

Figure 3B:
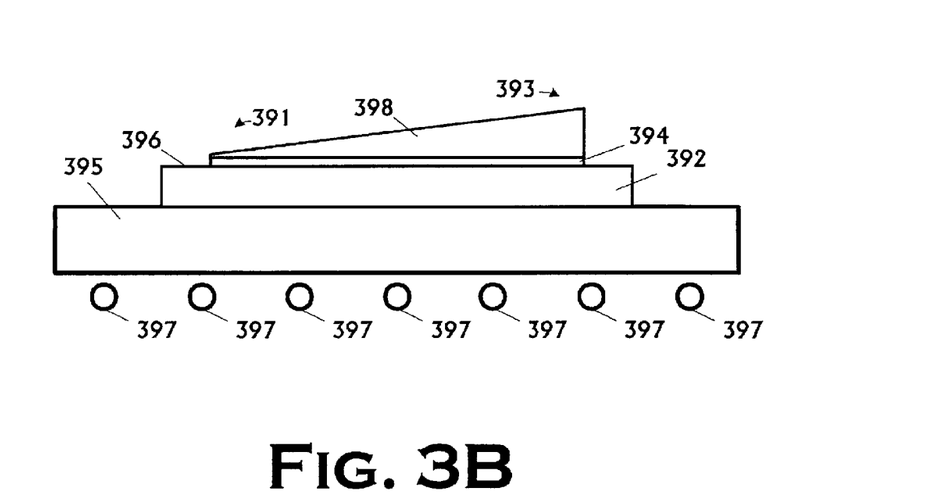
FIG. 3B conceptually illustrates the fabrication of a partially reflective surface in the embodiment of FIG. 3A.

Turning now to FIG. 3B, the partially reflective surface 340 may be deposited on a substrate 392, such as sapphire (crystalline $Al_2O_3$) or optical glass. In a Ti/Au coating, Ti plays the role of an adhesion layer 394, and needs to be no thicker than 50 Å. The Ti may be deposited by standard thin film metal deposition process such as sputtering or electron-beam evaporation. The thickness of this adhesion layer 394 would be uniform throughout the substrate surface 396.

The reflective layer 398, of Au, for instance, is intentionally graded from one end 391 to the other end 393, as illustrated in FIG. 3B. As an example, one edge of a square section of the substrate surface could be 100 Å (e.g., at the end 391) that continuously increases to 1500 Å (e.g., at the end 393). The graded thickness would result in the thinner region being only slightly reflective and highly transmissive to a gradually thicker region that would be almost entirely reflective.

Still referring to FIG. 3B, the deposition of the film with graded thickness for the reflective layer 398 can be achieved by controlling the temperature during deposition across the substrate 392, from one edge of the square to the opposite edge (e.g., from the end 391 to the end 393). The deposition technique could be evaporation or metalorganic chemical vapor deposition ("MOCVD"). The substrate 392 is heated on a heating block 395 (made of pyrolytic graphite, for example) in which the temperature is varied in a controlled manner. More particularly, the heating block 395 is heated with a row of lamp heaters 397 (e.g., infrared lamps) in which the currents are controlled individually with standard temperature controllers and the temperature is monitored with multiple thermocouple gauges. The individual heating lamps 397 are heated with varying currents to achieve a temperature gradient.

Returning to FIG. 3A, the fully reflective surface 350 may also be, in some embodiments, fabricated in accordance with conventional practice. The fully reflective surface 350 comprises a coating 385b on a substrate 390b. Note that no surface is truly 100% reflective because light can be expected to propagate through practically any material to at least some degree. However, many materials reflect such a substantial portion of any optical signal incident upon them that they are considered by those in the art to be "fully reflective." Any such material is suitable for the coating 385b. For instance, the coating 385b may provide a mirrored finish that would be considered "fully reflective." One suitable, commercially available material for the coating 385b would be Gold. The substrate 390b may be fabricated from the same material as the substrate 390a, although this is not necessary to the practice of the invention.

As was mentioned earlier, the fully reflective surface 350 is spaced apart from the partially reflective surface 340a distance D proportional to the width $t_w$ of the base pulse 360. In the illustrated embodiment, the distance D is calculated so that the propagation time for an optical signal to be reflected off the partially reflective surface 340, propagate to the fully reflective surface 350, reflect off the fully reflective surface 350, and propagate back to the partially reflective surface 340 is equal to the width $t_w$ of the base pulse 360. Stated in a more mathematical fashion:

$$t_w = t_1 + t_2$$

where:

$t_w$ = the width of the base pulse 360, as was defined above;

$t_1$ = the time it takes for a portion (e.g., the portion 380) of an optical signal (e.g., the base pulse 360) to reflect off the partially reflective surface 340 and propagate to the fully reflective surface 350; and $t_2$ = the time it takes for a portion of an optical signal to reflect off the fully reflective surface and propagate to the partially reflective surface 340.

Thus, the etalon 310 can be said to be "matched" to the base pulse 360.

Note that the speed at which the optical signal will propagate will depend on the medium, if any, inhabiting the cavity 355. The optical signal will propagate faster in a vacuum, for instance, than in an atmosphere of, for example, air. The optical signal will propagate more slowly in a medium more viscous than air. As will be apparent to those skilled in the art having the benefit of this disclosure will appreciate, variations in the propagation velocities may be compensated for, in some embodiments, by altering the size and/or volume of the cavity 355 for the etalon.

However, the cavity 355 will typically be filled with an atmosphere of air. Thus, where the individual pulses 200 (shown in FIG. 2) of the optical pulse train 110 (first shown in FIG. 1) have a pulse width $t_w = 1$ ns the etalon 310 will typically have a separation D between the two surfaces 340 and 350 of approximately 6". It follows that where $t_w = 1$ ps the etalon 310 will typically have a separation D between the two surfaces 340, 350 of approximately .006".

Still referring to FIG. 3A, the optical collector 320 and the combiner 325 may be implemented using any suitable technique known to the art. In the illustrated embodiment, the optical collector 320 comprises a lens. The combiner 325 will typically include optical detector(s) (not shown) and combinatorial electronic logic (also not shown). Note that the combiner 325 may, in some embodiments comprise a portion of the detector 140 (shown in FIG. 1).

Note that, because the distance D is proportional to the width of the base pulse 360, so will be the width of the stretched pulse (not shown). In particular, where the distance D is calculated so that the propagation time $t_1 + t_2 = t_w$ as was discussed above for the illustrated embodiment, the width of the stretched pulse will be directly proportional to the width $t_w$ of the base pulse 360. In fact, the width of the stretched pulse in the illustrated embodiment is an integer multiple of the width of the base pulse 360. Thus, the information carried by the width of the base pulse 360 can be retrieved from the width of the stretched pulse.

Figure 4:
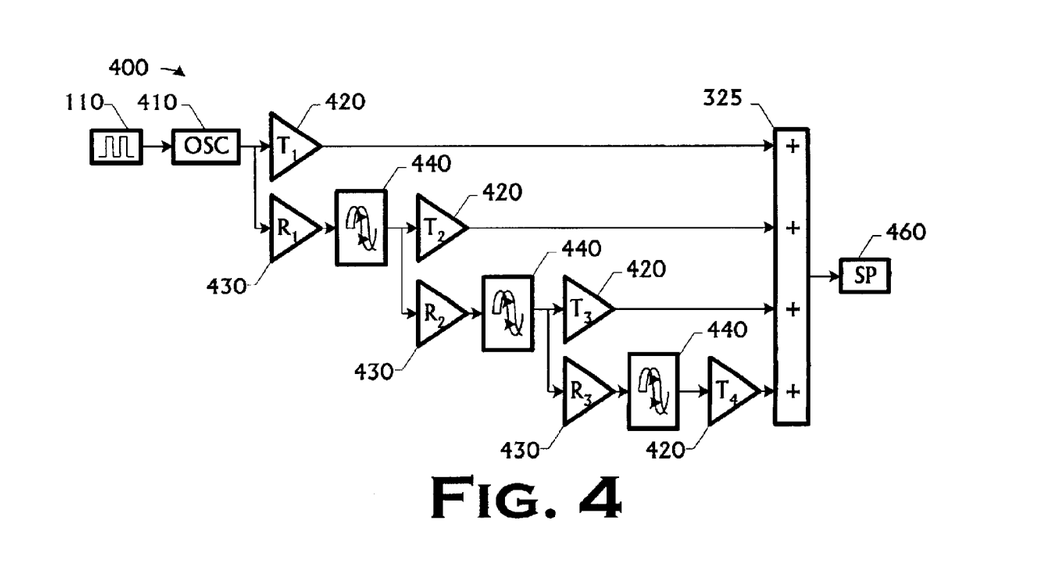
FIG. 4 models the operation of the optical pulse stretcher of the optical system of FIG. 1.

FIG. 4 models the operation of the OPS 120 of FIG. 1. The model 400 comprises the optical pulse train 110 (first shown in FIG. 1), an optical signal channel ("OSC") 410, a plurality of transmission factors 420, a plurality of reflection factors 430, and a plurality of transport delays 440. The OSC 410 represents the path of the optical pulse train 110 including reception by the optical receiver 330 and transmission paths prior to reception. The transmission factors 420 represent the percentage of an optical signal that propagates through the partially reflective surface 340 when it impinges thereon. The reflection factors 430 represent the percentage of an optical signal that is reflected when it impinges on the partially reflective surface 340. The transport delays 440 represent the propagation time $t_1+t_2$ discussed above for the reflected portion to travel to and reflect off the fully reflective surface 350 and back to the partially reflective surface 340.

More particularly, the elements of the model 400 can be correlated to the operation of the OPS 120 as illustrated in FIG. 3A, as follows:

$T_1$=percentage of the base pulse 360 propagating through the partially reflective surface 340 when it impinges thereon;

$R_1$=percentage of the base pulse 360 reflected as the reflected portion 380 when the base pulse 360 impinges on the partially reflective surface 340;

$T_2$=percentage of the reflected portion 380 propagating through the partially reflective surface 340 when it impinges thereon;

$R_2$=percentage of the reflected portion 380 reflected as the reflected portion 382 when the reflected portion 380 impinges on the partially reflective surface 340;

$T_3$=percentage of the reflected portion 382 propagating through the partially reflective surface 340 when it impinges thereon;

$R_3$=percentage of the reflected portion 382 reflected as the reflected portion 384 when the reflected portion 382 impinges on the partially reflective surface 340; and $T_4$=percentage of the reflected portion 384 propagating through the partially reflective surface 340 when it impinges thereon.

Note that the transport delays 440 are constant throughout the model and the values are determined by the pulse width $t_w$ as discussed above. Note also that there are no transmission factors 420 or reflection factors 430 associated with the fully reflective surface 350.

In accordance with another aspect of the present invention, the shape of the stretched pulse 460 can be controlled by manipulating the values of the transmission factors 420 and the reflection factors 430. This shaping can be achieved in the physical implementation of FIG. 3A by grading the coating 385*a* of the partially reflective surface 340. The coating 385*a* can be graded by varying the thickness and/or density of the material of the coating 385*a* across the substrate 390*a*. Techniques for grading partially reflective surfaces in this manner are known in other optics applications, such as the manufacture of telescopes and microscopes. Such techniques may be employed to grade the coating 385*a* to control the transmission factor of the partially reflective surface 340 as desired in selective locations.

Figure 5A:
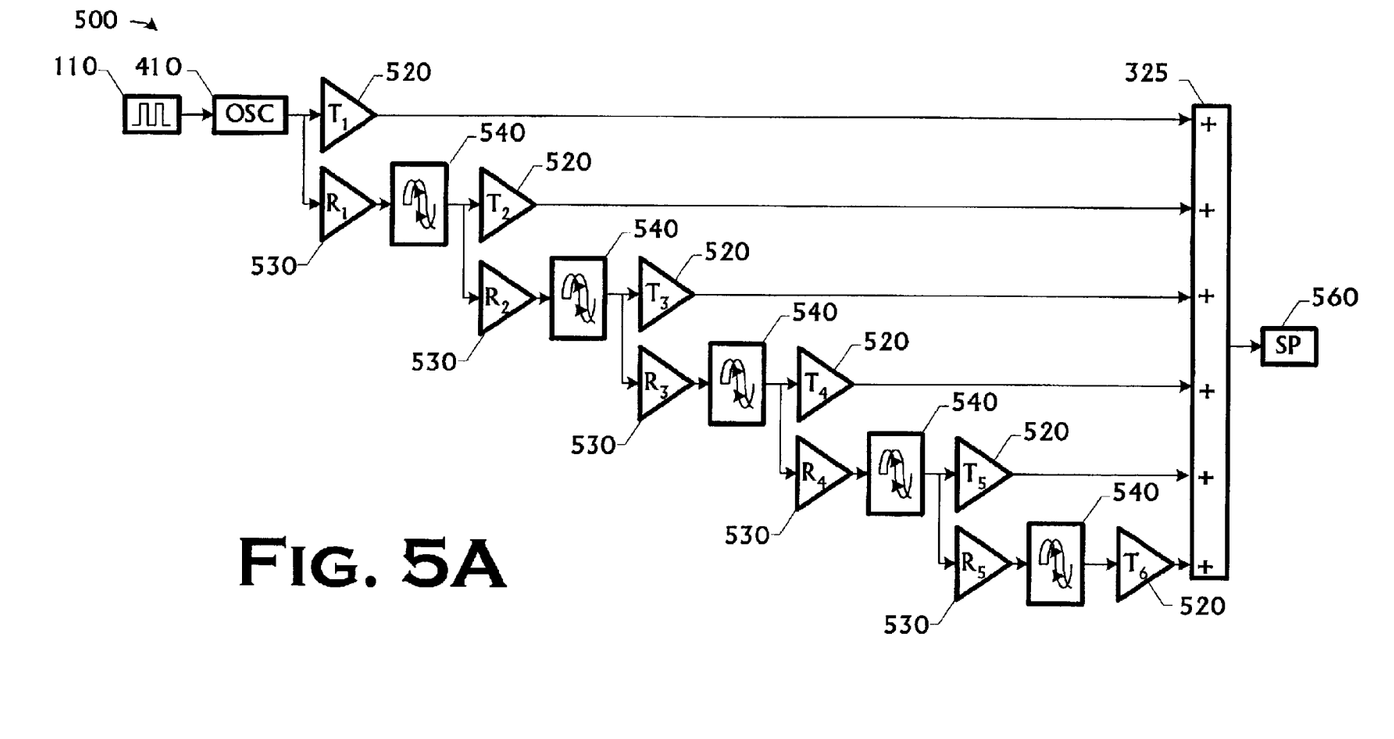
FIG. 5A, FIG. 5B, and FIG. 5C illustrate how manipulating selected reflection and transmission factors in an etalon of the optical pulse stretcher of FIG. 3A can shape the resultant stretched pulse.
Figure 5B:
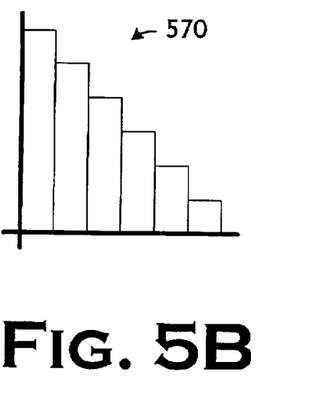

Consider, for instance, one particular implementation of the OPS 120 represented by the model 500 in FIG. 5A. Note that there are five reflections off and six transmissions through the partially reflective surface 340 (shown in FIG. 3A) in this particular implementation. Thus, the OPS 120 modeled in FIG. 5A can be referred to as a six tap OPS. Assume that the values of the transmission factors 530 and the reflection factors 530 remain constant (i.e., $T_1=T_2=T_3=T_4=T_5=T_6$ and $R_1=R_2=R_3=R_4=R_5$). The resultant stretched pulse 560 generated by the combiner 325 would look something like the stretched pulse 570 shown in FIG. 5B. However, if the values of the transmission factors 530 and the reflection factors 530 are varied as with a quadratic, e.g., $\cos^2$, the resultant stretched pulse 560 generated by the combiner 325 would look something like the stretched pulse 575 shown in FIG. 5C. Note that the transport delays 540 do not affect the shape of the stretched pulse 560.

Figure 6A:
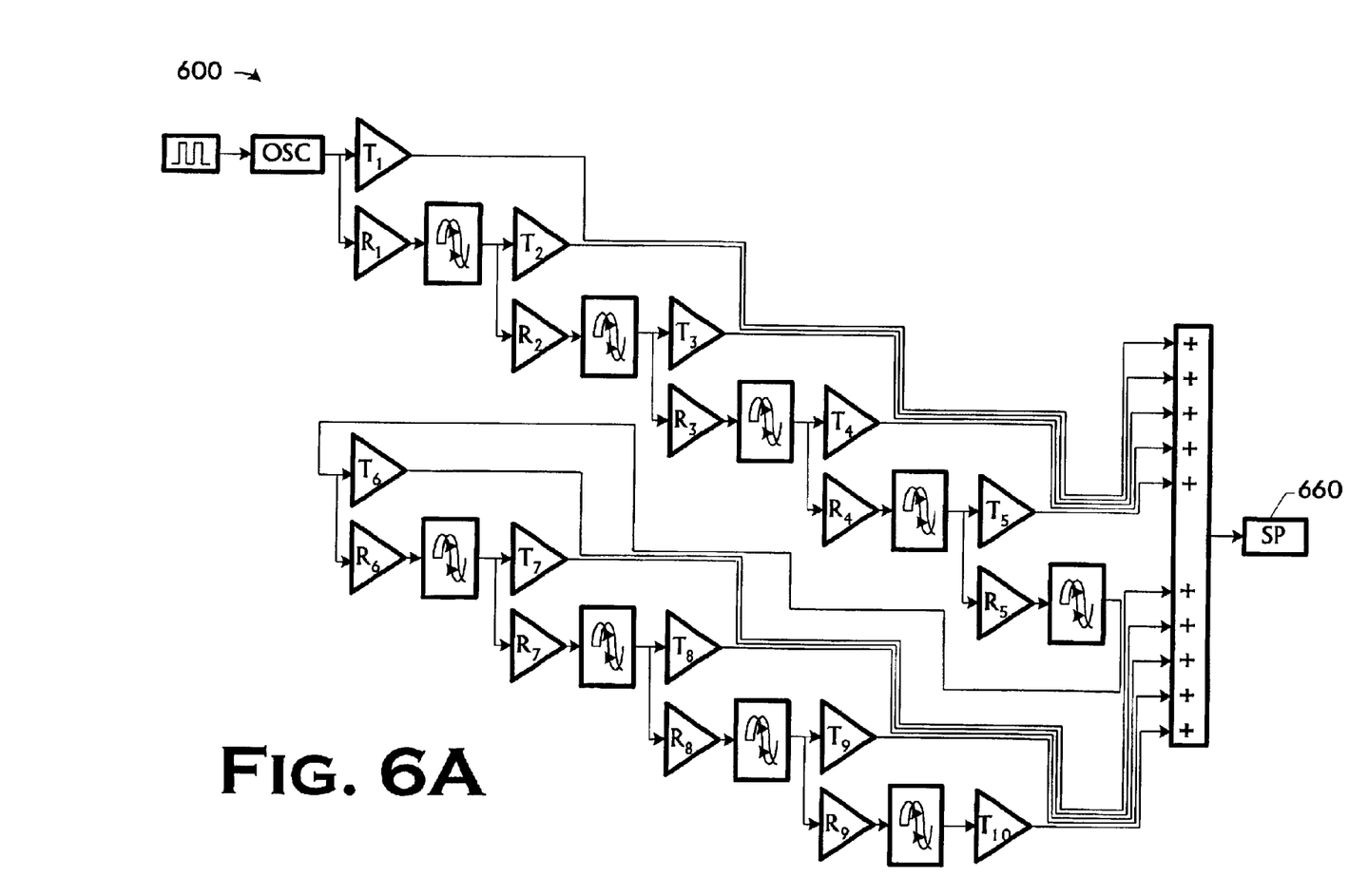
FIG. 6A, FIG. 6B, and FIG. 6C illustrate pulse shaping in one particular implementation of the present invention employing a ten-tap etalon.

For a more concrete example, consider a 10-tap implementation of the OPS 120 in FIG. 1 modeled in FIG. 6A. Assume that, in the model 600, the transmission factors and reflection factors are constant throughout the model 600, and are assigned the values in Table 1 and Table 2, respectively.

TABLE 1

Transmission Factor Values for FIG. 6A

| | |
|---|---|
| $T_1$ | 0.09 |
| $T_2$ | 0.09 |
| $T_3$ | 0.09 |
| $T_4$ | 0.09 |
| $T_5$ | 0.09 |
| $T_6$ | 0.09 |
| $T_7$ | 0.09 |
| $T_8$ | 0.09 |
| $T_9$ | 0.09 |
| $T_{10}$ | 0.09 |

TABLE 2

Reflection Factor Values for FIG. 6A

| | |
|---|---|
| $R_1$ | 0.90 |
| $R_2$ | 0.90 |
| $R_3$ | 0.90 |
| $R_4$ | 0.90 |
| $R_5$ | 0.90 |
| $R_6$ | 0.90 |
| $R_7$ | 0.90 |
| $R_8$ | 0.90 |
| $R_9$ | 0.90 |

Figure 6B:
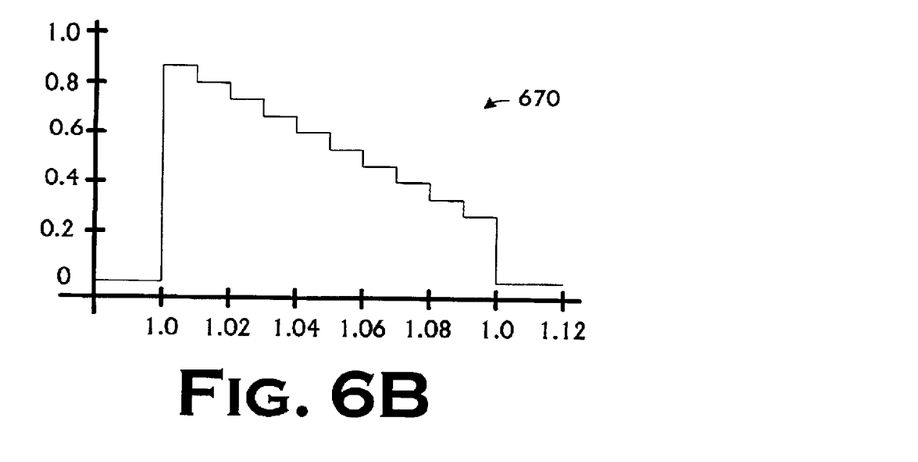

The values will generate a stretched pulse 660 shaped like the pulse 670 in FIG. 6B, ie., a "staircase" pulse. However, if the transmission factors and reflection factors are assigned the values in Table 3 and Table 4, respectively, then the resultant stretched pulse 660 will be a square, like the pulse 675 in FIG. 6C.

TABLE 3

Transmission Factor Values for FIG. 6A

| | |
|---|---|
| $T_1$ | 0.10 |
| $T_2$ | 0.11 |
| $T_3$ | 0.13 |
| $T_4$ | 0.14 |
| $T_5$ | 0.17 |
| $T_6$ | 0.20 |
| $T_7$ | 0.25 |
| $T_8$ | 0.33 |
| $T_9$ | 0.50 |
| $T_{10}$ | 1.00 |

TABLE 4

Reflection Factor Values for FIG. 6A

| | |
|---|---|
| $R_1$ | 0.90 |
| $R_2$ | 0.89 |
| $R_3$ | 0.88 |
| $R_4$ | 0.86 |
| $R_5$ | 0.83 |
| $R_6$ | 0.80 |
| $R_7$ | 0.75 |
| $R_8$ | 0.67 |
| $R_9$ | 0.50 |

Figure 6C:
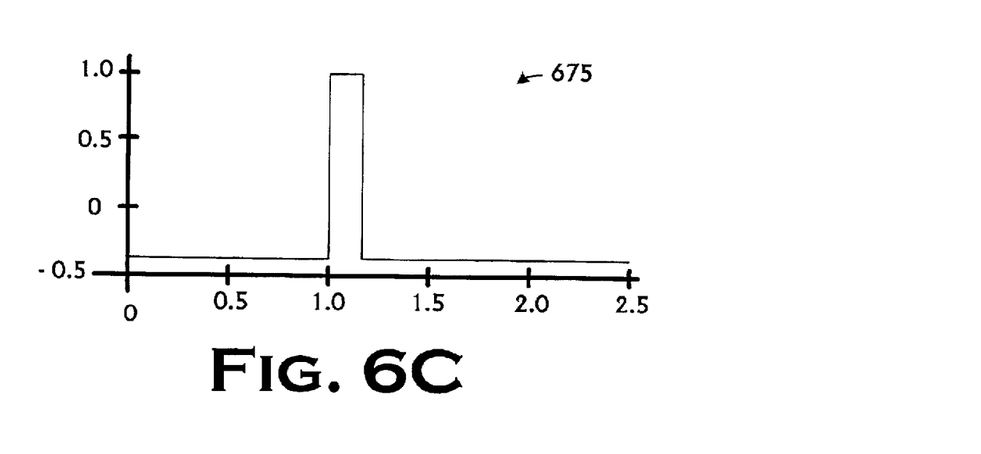

As was noted above, pulses presenting sharp transitions—like the pulses 670, 675 in FIG. 6B and FIG. 6C, respectively—can produce ringing in detectors' electronics.

Figure 5C:
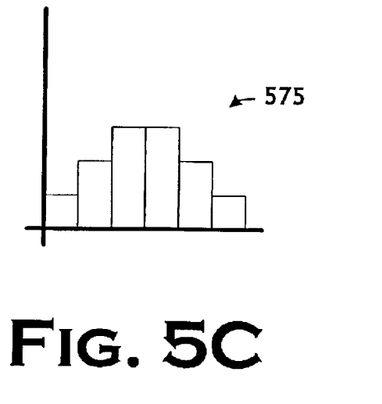
Figure 7A:
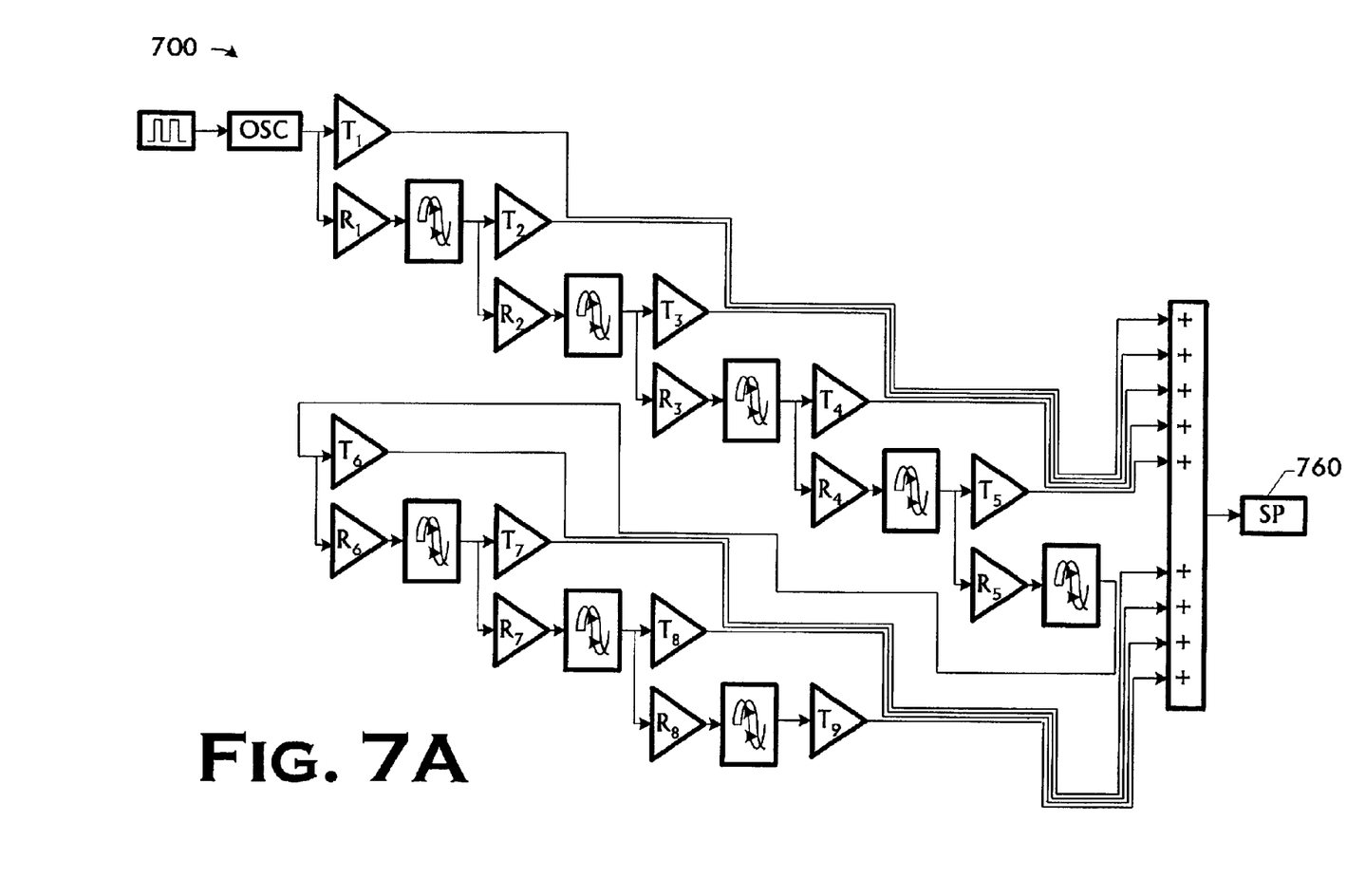
FIG. 7A and FIG. 7B illustrate pulse shaping in one particular implementation of the present invention employing a nine-tap etalon.

The transmission and reflection values can also be manipulated to produce shaped pulses that do not provoke ringing, such as the pulse 575 in FIG. 5C. Generally speaking, this may be more easily accomplished with an odd number of taps. FIG. 7A presents a model 700 of a 9-tap OPS. If the transmission and reflection factors are assigned the values set forth in Table 5 and Table 6, respectively, the stretched pulse 760 will look like the pulse 770 in FIG. 7B.

TABLE 5

Transmission Factor Values for FIG. 7A

| | |
|---|---|
| $T_1$ | 0.02 |
| $T_2$ | 0.07 |
| $T_3$ | 0.14 |
| $T_4$ | 0.23 |
| $T_5$ | 0.33 |
| $T_6$ | 0.45 |
| $T_7$ | 0.60 |
| $T_8$ | 0.78 |
| $T_9$ | 1.00 |

TABLE 6

Reflection Factor Values for FIG. 7A

| | |
|---|---|
| $R_1$ | 0.98 |
| $R_2$ | 0.93 |
| $R_3$ | 0.86 |
| $R_4$ | 0.77 |
| $R_5$ | 0.67 |
| $R_6$ | 0.55 |
| $R_7$ | 0.40 |
| $R_8$ | 0.22 |

Figure 7B:
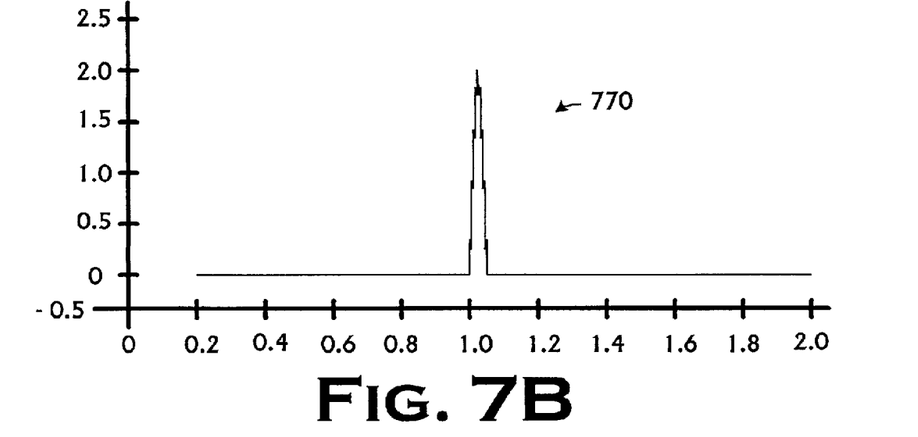

Note, however, that stretched pulses shaped like the pulses 575 and 770 may be achieved with even numbers of taps.

Figure 8:
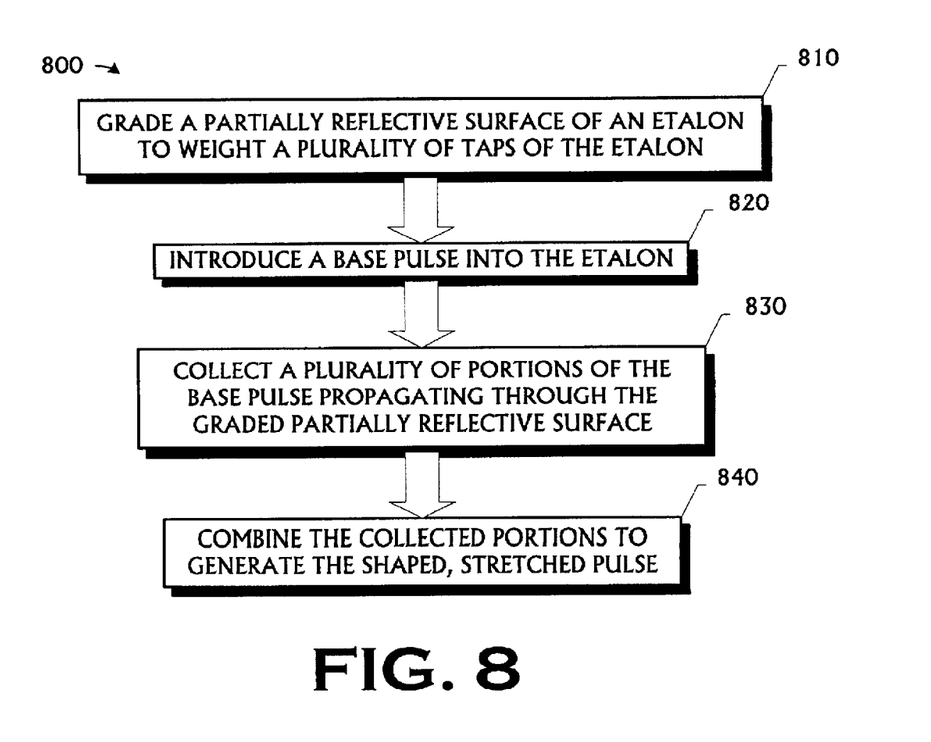
FIG. 8 illustrates a method for shaping a stretched pulse in accordance with one aspect of the present invention.

Thus, another aspect of the present invention is a method for shaping a stretched pulse. FIG. 8 illustrates a method 800 by which this may be done in accordance with the present invention. The method 800 begins by grading a partially reflective surface of an etalon to weight a plurality of taps of the etalon (at 810). Next, a base pulse is introduced into the etalon (at 820). The portions of the base pulse propagating through the graded partially reflective surface are then collected (at 830) and combined to generate the shaped, stretched pulse (at 840).

Figure 9:
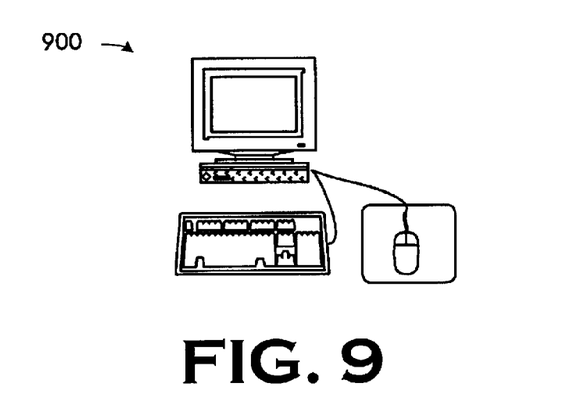
FIG. 9 depicts a computing apparatus with which the model of FIG. 4 can be implemented and the optical pulse stretcher of FIG. 3A may be simulated.

A model such as the model 400 can be employed in commonly used computerized simulation packages to help design and test designs of various embodiments of the OPS 120. FIG. 9 depicts a computing apparatus 900 programmed to model the OPS 120 and to simulate the operation of a physical implementation using that model. The computing apparatus 900 is a workstation, but may be virtually any type of computing apparatus, e.g., a desktop personal computer, or a laptop computer, provided suitable modeling and simulation software can be run thereon. The make and model of the workstation are, similarly, not material to the practice of the invention.

Figure 10:
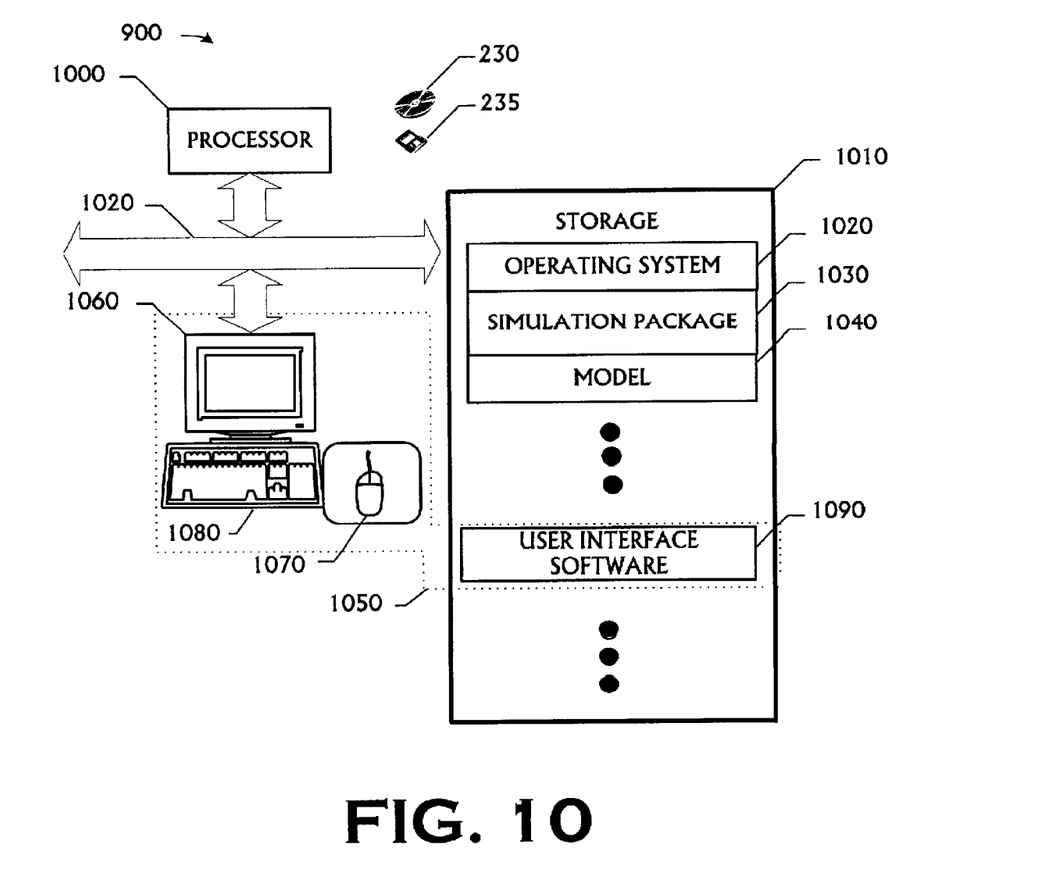
FIG. 10 illustrates selected portions of the hardware and software architectures of the computing apparatus of FIG. 9.

Selected portions of the hardware and software architectures of the computing apparatus 900 are shown in FIG. 10. The computing apparatus 9 includes a processor 1000 communicating with storage 1010 over a bus system 1020. The storage 1010, typically including a hard disk and RAM ("random access memory"), is encoded with an operating system 1020, a simulation package 1030, and a model 1040. A designer interacts with the operating system 1020 through the user interface 1050, comprising the monitor 1060, mouse 1070, keyboard 1080, and user interface software 1090, to invoke the simulation package 1030. The designer then uses the simulation package 1030 to design and test the model 1040. One suitable, commercially available, off-the shelf simulation package is MATLAB™, including the Simulink toolboxes. Various versions of MATLAB are well known and widely available in the art.

The designer builds the model 1040 from within the simulation package 1030. The model 1040 may be stored, if desired. The OSC 410 (shown in FIG. 4) can be modeled by a general Additive White Gaussian Noise Element ("AWGN"). The model 1040 can then be applied using the simulation package 1030. The results from this simulation can then be evaluated determine whether the modeled design will provide acceptable performance for the intended application.

Figure 11:
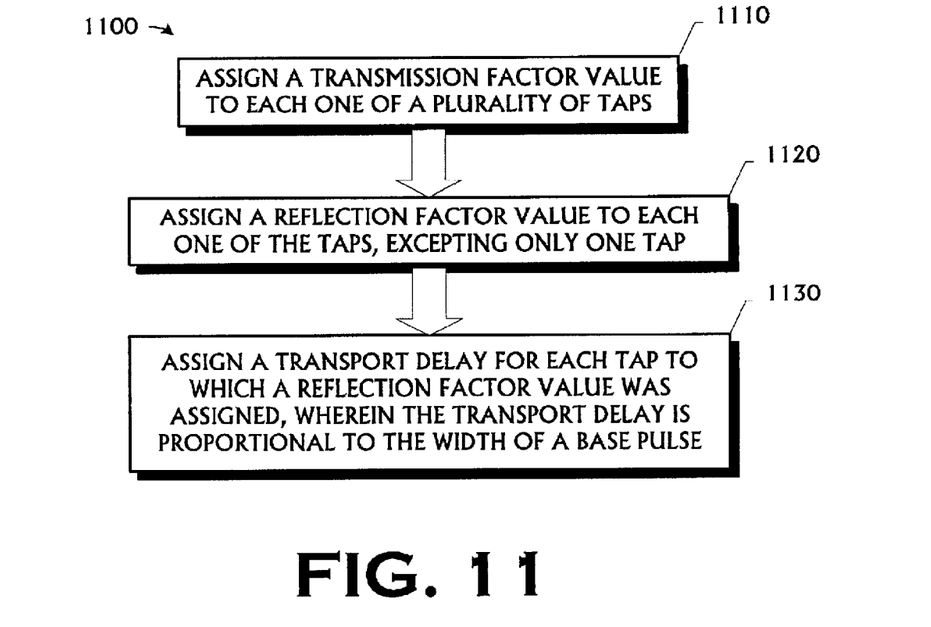
FIG. 11 illustrates a method for modeling the optical pulse stretcher of FIG. 1 in accordance with a further aspect of the invention.

Thus, a further aspect of the present invention is a method for modeling the OPS 120. FIG. 11 illustrates one embodiment of such a method for modeling the OPS 120. The method 1100 begins by assigning a transmission factor value to each one of a plurality of taps (at 1110). Next, a reflection factor value is assigned to each one of the taps, excepting only one tap (at 1120). A transport delay is the assigned for each tap to which a reflection factor value was assigned, wherein the transport delay is proportional to the width of a base pulse (at 1130). Note that the order in which these acts are performed is not material to the practice of the invention, and that they may be performed in any order.

The model is software implemented, and so various manifestations of this aspect include instructions encoded on a program storage medium that, when executed by a computer, perform such a method and a computing apparatus programmed to perform such a method. The program storage medium may be magnetic (e.g., the floppy disk 1085 in FIG. 10 or a hard disk) or optical (e.g., the compact disk read only memory, or "CD ROM" 1095 in FIG. 10), and may be read only or random access. Similarly, as was mentioned above, the computing apparatus may be any computer on which suitable software can be loaded and executed, e.g., the workstation 900. The invention is not limited by these aspects of any given implementation.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An etalon, comprising:
   a port through which a base pulse may be introduced;
   a partially reflective surface against which the base pulse may impinge; and
   a fully reflective surface spaced apart from the partially reflective surface in operative relationship to the partially reflective surface, the distance between the fully reflective and partially reflective surfaces being a function of predetermined proportionality between the width of an output pulse and the width of the base pulse.

2. The etalon of claim 1, wherein the partially reflective surface is graded.

3. The etalon of claim 1, wherein the distance is determined so that the time for an optical signal to reflect off the partially reflective surface, propagate to the fully reflective surface, reflect off the fully reflective surface, and propagate to the partially reflective surface is equal to an integer multiple of the width of the base pulse.

4. The etalon of claim 1, wherein at least one of the partially reflective surface and the fully reflective surface includes:
   a substrate; and
   a coating on the substrate.

5. The etalon of claim 4, wherein the coating on the substrate is graded.

6. The etalon of claim 4, wherein the coating comprises a Ti/Au coating and the substrate comprises an optical glass or a sapphire.

7. The etalon of claim 4, wherein the coating comprises a Au coating and the substrate comprises an optical glass or a sapphire.

8. An etalon, comprising:
   means for introducing a base pulse into a cavity defined by the etalon;
   means for partially reflecting the base pulse; and
   means for fully reflecting the partially reflected base pulse spaced apart from the partially reflecting means in operative relationship thereto, the fully reflecting means being spaced apart from the partially reflective means a distance being a function of predetermined proportionality between the width of an output pulse and the width of the base pulse.

9. The etalon of claim 8, wherein the partially reflective means is graded.

10. The etalon of claim 8, wherein the distance is determined so that the time for an optical signal to reflect off the partially reflective means, propagate to the fully reflective means, reflect off the fully reflective means, and propagate to the partially reflective means is equal to an integer multiple of the width of the base pulse.

11. The etalon of claim 8, wherein at least one of the partially reflective means and the fully reflective means includes:
    a substrate; and
    a coating on the substrate.

12. An optical pulse stretcher, comprising:
    a port through which a base pulse may be introduced;
    a partially reflective surface against which the base pulse may impinge;
    a fully reflective surface spaced apart from the partially reflective surface a distance that is a function of predetermined proportionality between the width of an output pulse and the width of the base pulse and in operative relationship to the partially reflective surface;
    an optical collector capable of collecting a plurality of base pulse components propagating through the partially reflective surface; and
    a combiner capable of combining the collected base pulse components and outputting a stretched pulse.

13. The optical pulse stretcher of claim 12, wherein the partially reflective surface is graded.

14. The optical pulse stretcher of claim 12, wherein the distance is determined so that the time for an optical signal to reflect off the partially reflective surface, propagate to the fully reflective surface, reflect off the fully reflective surface, and propagate to the partially reflective surface is equal to an integer multiple of the width of the base pulse.

15. The optical pulse stretcher of claim 12, wherein at least one of the partially reflective surface and the fully reflective surface includes:
    a substrate; and
    a coating on the substrate.

16. The optical pulse stretcher of claim 15, wherein the coating on the substrate is graded.

17. The optical pulse stretcher of claim 15, wherein the coating comprises a Ti/Au coating and the substrate comprises an optical glass or a sapphire.

18. The optical pulse stretcher of claim 15, wherein the coating comprises a Au coating and the substrate comprises an optical glass or a sapphire.

19. The optical pulse stretcher of claim 12, wherein the optical collector comprises a lens.

20. An optical system, comprising:
    an optical receiver capable of receiving an optical signal;
    an optical pulse stretcher, including:
       a port through which a base pulse of the optical signal may be introduced;
       a partially reflective surface against which the base pulse may impinge;
       a fully reflective surface spaced apart from the partially reflective surface a distance that is a function of predetermined proportionality between the width of an output pulse and the width of the base pulse and in operative relationship to the partially reflective surface;
       an optical collector capable of collecting a plurality of base pulse components propagating through the partially reflective surface; and
       a combiner capable of combining the collected base pulse components and outputting a stretched pulse; and
    a detector capable of processing the stretched pulse.

21. The optical system of claim 20, wherein the partially reflective surface is graded.

22. The optical system of claim 20, wherein the distance is determined so that the time for an optical signal to reflect off the partially reflective surface, propagate to the fully reflective surface, reflect off the fully reflective surface, and propagate to the partially reflective surface is equal to an integer multiple of the width of the base pulse.

23. The optical system of claim 20, wherein at least one of the partially reflective surface and the fully reflective surface includes:

a substrate; and a coating on the substrate.

24. The optical system of claim 23, wherein the coating on the substrate is graded.

25. The optical system of claim 23, wherein the coating comprises a Ti/Au coating and the substrate comprises an optical glass or a sapphire.

26. The optical system of claim 23, wherein the coating comprises a Au coating and the substrate comprises an optical glass or a sapphire.

27. The optical system of claim 20, wherein the optical collector comprises a lens.

28. A method for stretching an optical pulse, comprising:

introducing a base pulse into an etalon, the etalon including a fully reflective surface spaced apart from a partially reflective surface a distance that is a function of a predetermined proportionality between the width of an output pulse and the width of the base pulse;

collecting a plurality of portions of the base pulse propagating from the etalon; and combining the plurality of portions to generate a stretched pulse whose width is proportional to the width of the base pulse.

29. The method of claim 28, wherein collecting the plurality of portions includes focusing the portions on a combiner.

30. The method of claim 28, wherein combining the portions to generate a stretched pulse includes combining the portions to generate a shaped, stretched pulse.

31. The method of claim 30, wherein combining the collected portions to generate the shaped, stretched pulse includes combining the collected portions to generate a pulse having a shape selected from the group consisting of a staircase, a square, and a sinusoid.

32. The method of claim 28, further comprising grading the partially reflective surface.

33. The method of claim 32, wherein grading the partially reflective surface includes varying the thickness or density of a coating on a substrate.

* * * * *